2,810,715

DISPERSING AGENTS FOR VINYLIDENE CHLORIDEALKYL ACRYLATE COPOLYMERIZATION

Edmund F. Jordan, Jr., Philadelphia, Pa., assignor to the United States of America as represented by the Secretary of Agriculture No Drawing. Application March 22, 1955,
Serial No. 496,084

2 Claims. (Cl. 260—86.3)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

Suspension polymerization is a preferred technique with most monomer systems because it yields a very pure polymer in the form of uniform spherical beads or particles which are easily washed and dried and are of a high bulk density, yet are loose and free-flowing.

The object of this invention is to provide improved dispersing agents for use in the copolymerization of vinylidene chloride with higher alkyl acrylates in aqeuous suspension.

A great variety of dispersing agents have been used or suggested for use with various monomers but none has been found that is suitable for all monomer systems.

These agents may be divided into two groups: organic and inorganic. The most commonly used organic dispersing agents are polyvinyl alcohol, carboxymethyl cellulose, gelatine and similar water-soluble polymeric materials. The inorganic agents are usually insoluble salts such as magnesium or calcium carbonate, fuller's earth, alumina, talc, etc. In the selection of a dispersing agent it is impossible to generalize, or predict which may be useful with a particular monomer system. Consequently, it is necessary to experiment empirically until a suitable one is found. Heretofore, such agents have been usually used singly, no advantage having been found in combining two or more of them. In particular, organic and inorganic dispersing agents have not been used together because of their great dissimilarity in properties.

For the polymerization of vinylidene chloride many dispersing agents, both organic and inorganic are useful. However, for the copolymerization of vinylidene chloride and higher alkyl acrylates, none of these is effective. I have now discovered that certain combinations of conventional dispersing agents are highly satisfactory for this purpose.

According to the invention, vinylidene chloride and higher alkyl acrylates can be very satisfactorily polymerized in aqueous suspension if the dispersing agent is a combination of polyvinyl alcohol and either fuller's earth or magnesium carbonate. None of these dispersing agents is usable with this monomer system, either alone or in other combinations.

The monomer compositions for which my novel dispersing agents are useful are mixtures of vinylidene chloride and higher alkyl acrylates wherein the mol percent of acrylate is not more than about 25%. While pure vinylidene chloride (0% acrylate) may be used satisfactorily, my dispersing agents have no special value therewith because many satisfactory dispersing agents for this monomer are known.

In the practice of the invention the fuller's earth or magnesium carbonate and the polyvinyl chloride are used in the same proportions and with the same procedures that are used with conventional dispersing agents, no special equipment, materials or procedures being required. The polyvinyl alcohol must be water soluble and is conveniently prepared as a solution containing the percentage desired in the polymerization process. Such a solution is then used to provide the water and the polyvinyl alcohol to be used in the polymerization process. Usually this percentage will be in the range of about 0.5 to 2%, through more or less may sometimes be used in the range of about 0.1 to 5%.

The inorganic dispersing agent is most conveniently added to the monomer-water mixture as a dry powder and is usually used in an amount in about the same range as given above for the polyvinyl alcohol. The amounts and the relative proportions of organic and inorganic dispersing agent used is not critical and may be varied widely, depending on the monomer mixture used, the particle size desired in the copolymer and the type and vigor of agitation used.

In suspension polymerization the monomer is not emulsified in the aqueous phase but is dispersed as droplets. Constant gentle agitation is essential to maintain such a dispersion, especially when uniform particle size is desired in the polymer. Usually a particle size in the range of 20 to 80-mesh is preferred. Larger sizes are likely to be non-uniform in size and shape while smaller ones are powderlike and are more difficult to wash, dry and handle, not being of a free-flowing character.

In order to be able to compare various dispersing agents under uniform conditions, I have devised a standardized polymerization experiment which utilizes the following general procedure:

Fifty grams of total monomer, 100 g. of water, and the desired amounts of dispersing agents and catalyst (benzoyl peroxide) are mixed in a glass container under an inert atmosphere. The containers are then placed in a bath at 50 C. and constantly rotated at 27 R. P. M. for 48 hours. The polymer thus formed is recovered by filtration, washed with distilled water, stirred 10 minutes in 10% sulfuric acid to remove magnesium carbonate if the latter were present, again washed with distilled water, extracted 5 times, for 3 hours each time, with 200 ml. portions of hot methanol, filtered and dried. The yield is 70 to 98% and is usually about 85%. The particle size of the product is then determined by screening the dry polymer.

The examples described below were prepared by the procedure described above. Percentages of benzoyl peroxide were based on total monomer; percentages of polyvinyl alcohol (PVA) were based on water used; and percentages of fuller's earth and magnesium carbonate ($MgCO_3$) were based on total monomer plus water. All these percentages are by weight. In Examples 1–5 the total monomer was 10 mol percent of octadecyl acrylate and 90 mol percent of vinylidene chloride while the catalyst was 0.25 mol percent of benzoyl peroxide. In Examples 6–8 the total monomer was 20 mol percent of octadecyl acrylate and 80 mol percent vinylidene chloride while the catalyst was 0.50 mol percent of benzoyl peroxide. In Examples 9–11 the monomers were 5, 10 and 20 mol percent, respectively, of octyl acrylate and 95, 90 and 80 mol percent, respectively, of vinylidene chloride, while the catalyst was 0.08 mol percent of benzoyl peroxide.

Examples

| Example No. | Dispersing Agent, Percent | Particle Size, of Polymer, Percent | | |
|---|---|---|---|---|
| | | Through 80-mesh | Through 20-mesh | Over 8-mesh |
| 1 | fuller's earth, 1 | | | 100 |
| 2 | PVA, 0.5 | | | 100 |
| 3 | MgCO$_3$, 1 | | | 100 |
| 4 | fuller's earth, 1 / PVA, 0.5 | 95 | 5 | 0 |
| 5 | MgCO$_3$, 1 / PVA, 0.5 | 95 | 5 | 0 |
| 6 | PVA, 1 | | | 100 |
| 7 | MgCO$_3$, 1 | | | 100 |
| 8 | MgCO$_3$, 1 / PVA, 0.5 | 94 | 6 | 0 |
| 9 | MgCO$_3$, 1 / PVA, 0.5 | 96 | 3 | 1 |
| 10 | MgCO$_3$, 1 / PVA, 0.5 | 97 | 3 | 0 |
| 11 | MgCO$_3$, 1 / PVA, 0.5 | 96 | 4 | 0 |

Substantially identical results are obtained when the octyl or octadecyl acrylate used in these examples is replaced with other alkyl acrylates, or mixtures thereof, wherein the alkyl radicals contain 8 to 18 carbon atoms. Likewise, no substantial change is caused by use of other catalysts, other proportions of monomer to water, or similar variations in conventional polymerization conditions.

I claim:

1. A process for copolymerizing, in an aqueous suspension, a mixture of vinylidene chloride and a higher alkyl acrylate, said mixture containing not more than about 25 mol percent of acrylate, the alkyl groups of said acrylate containing 8 to 18 carbon atoms, comprising mixing said vinylidene chloride and acrylate with water, a polymerization catalyst and a dispersing agent, said dispersing agent consisting of a mixture of polyvinyl alcohol in the range of about 0.1 to 5% and a material selected from the group consisting of fuller's earth and magnesium carbonate, heating at a temperature and for a time sufficient to effect substantial polymerization, and recovering the polymer thus formed.

2. A process as in claim 1 wherein the dispersing agent is a mixture of polyvinyl alcohol in the range of about 0.1 to 5% and magnesium carbonate.

References Cited in the file of this patent

UNITED STATES PATENTS

| | | |
|---|---|---|
| 2,473,929 | Wilson | June 21, 1949 |
| 2,556,260 | Downing | June 12, 1951 |

OTHER REFERENCES

Journal of Polymer Science, article by Hohenstein et al., volume 1, pages 137–141, 1946.